A. F. THOMPSON.
NUT LOCK.
APPLICATION FILED APR. 20, 1918.

1,275,105. Patented Aug. 6, 1918.

Inventor
Andrew F. Thompson

By Victor J. Evans
Attorney

Witness
George Kuttner

UNITED STATES PATENT OFFICE.

ANDREW F. THOMPSON, OF ENGLEWOOD, KANSAS.

NUT-LOCK.

1,275,105. Specification of Letters Patent. Patented Aug. 6, 1918.

Application filed April 20, 1918. Serial No. 229,782.

*To all whom it may concern:*

Be it known that I, ANDREW F. THOMPSON, a citizen of the United States, residing at Englewood, in the county of Clark and State of Kansas, have invented new and useful Improvements in Nut-Locks, of which the following is a specification.

This invention relates to improvements in means for locking a nut on a bolt.

In carrying out my invention it is my purpose to screw on a bolt having a square end, a nut provided with means for removably engaging with a cap or locking member that is held by the square end of the bolt, and thus prevent the nut turning with the bolt.

It is also my purpose to provide a locking means whereby a nut may be locked at any desired position with respect to the length of a bolt and removed from the bolt when desired.

Other objects and advantages will appear as the nature of the invention is better understood, reference being had to the accompanying drawings, in which, Figure 1 is a sectional view through a structure connected by a nut and bolt, illustrating the improvement.

Figure 1:
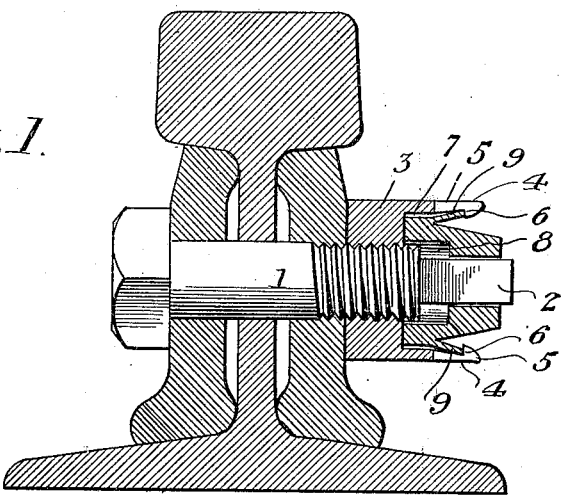
Figure 2:
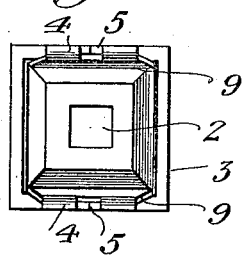
Fig. 2 is a front elevation of the same looking toward the nut.
Figure 3:
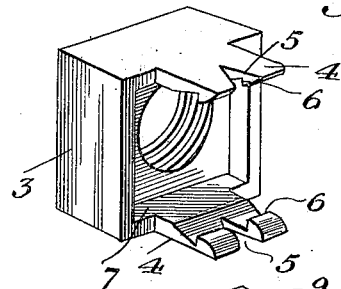
Fig. 3 is a perspective view of the nut.
Figure 5:
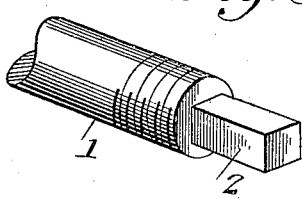
Fig. 5 is a detail view of the outer end of the bolt.
Figure 4:
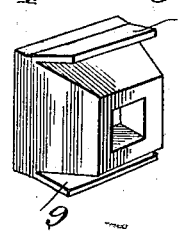
Fig. 4 is a similar view of the locking member.

As disclosed by the drawings I employ a bolt 1 having its shank, at end of its threads provided with a square extension 2.

On the bolt is screwed a nut 3. This nut, upon its outer face, and upon two of its diametrically opposing sides is formed with outstanding lugs 4, the said lugs being notched, as at 5 upon their outer ends. The lugs, upon their inner faces are provided with transverse depressions or notches 6 which intersect the notches 5.

The nut, upon its outer face is provided with a rectangular depression forming a pocket 7.

The locking member is in the nature of a cap nut provided with a bore of two dimensions and of two shapes. The bore, from the inner end of the locking member is enlarged as at 8, the said enlarged portion being of a comparatively great depth and designed to be arranged over the round threaded portion of the bolt, the remainder of the bore being square to receive the square end of the bolt. The locking member is also square in cross section, especially at the inner end thereof so that this portion may be received in the pocket at the outer end of the nut. The locking member is preferably constructed of spring steel and has two of its diametrically opposed sides cut transversely and the metal between the cuts bent outwardly to form spring fingers 9. These fingers are adapted to be arranged against the inner face of the lugs on the nut and engage with the straight shoulders provided by the notches in the said inner faces of the lugs. This locks the locking member with the nut, the contacting engagement of the walls of the square portion of the locking member with the square end of the bolt, securing the locking member to the bolt. The springs are sufficiently strong to prevent an outward movement of the locking member with respect to the nut. The locking member may be removed from the nut and bolt by a suitable instrument, such as pincers having pointed jaws inserted through the end notches of the lugs and contacting with the spring fingers to force the same out of the transverse notches of the lugs.

From the foregoing description, it is believed that the simplicity and advantages of the construction, when taken in connection with the drawings, will be apparent without further detailed description.

Having thus described the invention, what I claim is:

1. In combination with a bolt having a square end, a nut member on said bolt, lugs projecting from two of the opposing sides of the nut, a locking member arranged between the lugs and having a bore receiving the square end of the bolt, and spring means carried by said locking member and co-engaging with the lugs for removably locking the said member between the lugs and to the nut.

2. In combination with a bolt having a square end, a nut screwed on said bolt, said nut having at two of its opposed sides outwardly extending lugs which are notched on the inner faces thereof, a locking member having a bore engaging with the square end of the bolt and arranged between the lugs, and spring locking means integrally formed with said member designed to engage in the notches of the lugs.

3. In combination, a bolt having a square end, a nut screwed on said bolt, said nut having outwardly extending lugs on two of the opposed faces thereof, said lugs, at the ends thereof being notched, said lugs having their inner faces provided with transverse notches intersecting the first mentioned notches, a locking member having a bore to receive both the threaded and the square end of the bolt, integrally formed spring members on two of the opposed sides of the locking member, and said spring member adapted to engage with the said transverse notches on the inner faces of the lugs.

4. In combination, a bolt having a square end, a nut threaded on said bolt, said nut having outwardly extending lugs which are notched at their outer ends and which are provided on their inner faces with notches intersecting the first mentioned notches, said nut, upon the outer face thereof being formed with a pocket, a locking member having a bore to receive both the threaded and square portion of the bolt and being of a size to be received in the pocket of the nut, said locking member being constructed of spring material and having two of its opposed sides integrally formed with outwardly extending spring elements adapted to engage with the notches on the inner faces of the lugs.

In testimony whereof I affix my signature.

ANDREW F. THOMPSON.

Copies of this patent may be obtained for five cents each, by addressing the "Commissioner of Patents, Washington, D. C."